United States Patent
Xiong

(10) Patent No.: US 12,470,984 B2
(45) Date of Patent: Nov. 11, 2025

(54) METHOD, APPARATUS, COMPUTER READABLE MEDIUM, AND ELECTRONIC DEVICE FOR COMMUNICATION

(71) Applicant: TENCENT TECHNOLOGY (SHENZHEN) COMPANY LIMITED, Guangdong (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 401 days.

(21) Appl. No.: 17/984,730

(22) Filed: Nov. 10, 2022

(65) Prior Publication Data

US 2023/0062526 A1 Mar. 2, 2023

Related U.S. Application Data

(63) Continuation of application No. PCT/CN2021/127343, filed on Oct. 29, 2021.

(30) Foreign Application Priority Data

Nov. 8, 2020 (CN) .......................... 202011234943.2

(51) Int. Cl.
*H04W 28/24* (2009.01)
*H04W 28/02* (2009.01)
*H04W 72/543* (2023.01)

(52) U.S. Cl.
CPC ....... *H04W 28/24* (2013.01); *H04W 28/0268* (2013.01); *H04W 72/543* (2023.01)

(58) Field of Classification Search
CPC .......................... H04W 28/24; H04W 72/543; H04W 28/0268
See application file for complete search history.

(56) References Cited

U.S. PATENT DOCUMENTS

2019/0387426 A1\* 12/2019 Lee .................. H04W 28/0284
2020/0120536 A1\* 4/2020 Prakash ................ H04W 72/12
(Continued)

FOREIGN PATENT DOCUMENTS

CN 110505653 A 11/2019
CN 111436077 A 7/2020
(Continued)

OTHER PUBLICATIONS

Written Opinion for PCT/CN2021/127343, dated Jan. 17, 2022.
(Continued)

*Primary Examiner* — Benjamin H Elliott, IV
*Assistant Examiner* — Tracy Lauren Raimondo
(74) *Attorney, Agent, or Firm* — Sughrue Mion, PLLC

(57) ABSTRACT

A method, an apparatus, a computer-readable medium, and an electronic device for communication are provided. The communication method includes: receiving a request message transmitted by an application function (AF) entity, the request message including a service characteristic of an interactive service data flow, the service characteristic of the interactive service data flow including periodicity information and flow direction information; generating a policy and charging control (PCC) rule based on the request message, the PCC rule including a quality of service (QoS) parameter corresponding to the service characteristic of the interactive service data flow; and transmitting, to a session management function (SMF) entity, the PCC rule upon which a QoS configuration file is transmitted from the SMF entity to a radio access network (RAN) side, the QoS configuration file comprising a QoS flow for the interactive service data flow.

13 Claims, 7 Drawing Sheets

(56) References Cited

U.S. PATENT DOCUMENTS

| | | | |
|---|---|---|---|
| 2020/0214054 A1* | 7/2020 | Qiao | H04M 15/8228 |
| 2020/0344638 A1* | 10/2020 | Ding | H04W 28/0268 |
| 2020/0396000 A1* | 12/2020 | Ryu | H04W 76/25 |
| 2021/0075864 A1* | 3/2021 | Sun | H04W 28/0236 |
| 2021/0314807 A1* | 10/2021 | Li | H04W 28/12 |
| 2022/0095398 A1* | 3/2022 | Pan | H04W 76/14 |
| 2022/0141662 A1* | 5/2022 | Liao | H04W 12/08 726/1 |
| 2022/0165191 A1* | 5/2022 | Yao | G09G 5/006 |
| 2022/0361047 A1* | 11/2022 | Kahn | H04W 28/24 |

FOREIGN PATENT DOCUMENTS

| | | |
|---|---|---|
| CN | 112437122 A | 3/2021 |
| WO | 2020/163635 A1 | 8/2020 |

OTHER PUBLICATIONS

International Search Report for PCT/CN2021/127343, dated Jan. 17, 2022.

European Office Action dated Mar. 18, 2024 in Application No. 21888492.2.

Ericsson, "QoS Container vs. TSCAI Input Container," SA WG2 Meeting #S2-138E, Apr. 20-24, 2020, 7 pages total, S2-2003261.

China Mobile, "Supplement for TSN QoS Information," 3GPP TSG-SA2 Meeting #140E, Aug. 19-Sep. 2, 2020, 5 pages total, S2-20044871.

Japanese Office Action issued Mar. 4, 2024 in Application No. 2023-525597.

Translation of Written Opinion of the International Searching Authority issued Jan. 17, 2022 in Application No. PCT/CN2021/127343.

Nokia et al., S2-1907533, update to Policy Framework for TSC, 3GPP TSG SA WG2 #134 (Jun. 18, 2019. 3GPP server disclosure), Jun. 24-28, 2018, Osaka, Sapporo, Tokyo. Cited in KR OA dated Jul. 18, 2025.

CATT, R2-1816361, Ran scheduling impacts from TSN requirements, 3GPP TSG RAN WG2 #104 (Nov. 2, 2018. 3GPP server disclosure), Spokane, USA, Nov. 12-16, 2018. Cited in KR OA dated Jul. 18, 2025.

Communication from Korean Patent Office dated Jul. 18, 2025 in Application No. 10-2023-7018753 with English Translation.

* cited by examiner

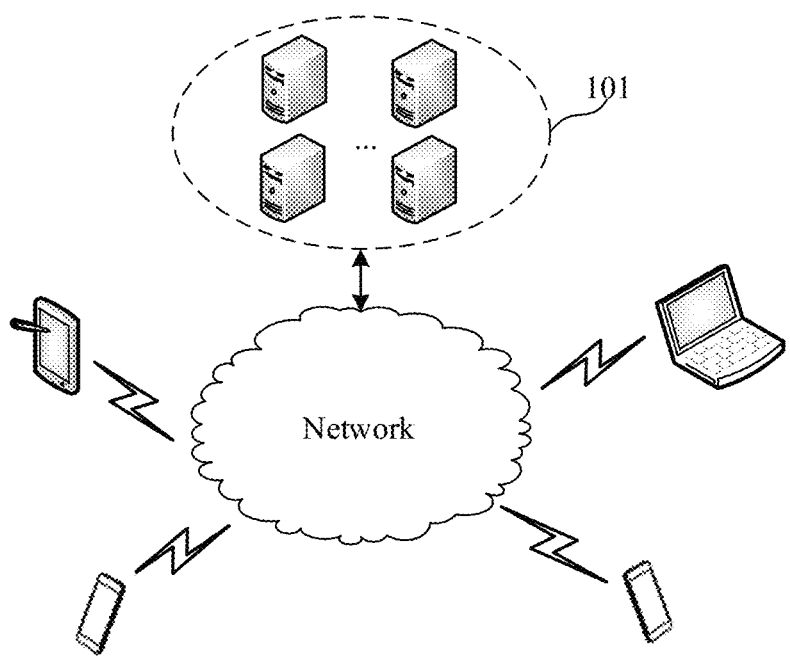

FIG. 1

Receive a request message transmitted by an AF entity, the request message including a service characteristic of an interactive service data flow, the service characteristic of the interactive service data flow including periodicity information and flow direction information, the periodicity information being used for indicating a data packet transfer period of the interactive service data flow, and the flow direction information being used for indicating a link direction corresponding to the periodicity information — S210

Generate a PCC rule according to the request message, the PCC rule including a QoS parameter corresponding to the service characteristic of the interactive service data flow — S220

Transmit the PCC rule to an SMF entity, so that the SMF entity transmits a QoS configuration file to a RAN side based on the PCC rule, the QoS configuration file including a QoS flow for the interactive service data flow — S230

FIG. 2

METHOD, APPARATUS, COMPUTER READABLE MEDIUM, AND ELECTRONIC DEVICE FOR COMMUNICATION

CROSS-REFERENCE TO RELATED APPLICATION(S)

This application is a continuation application of International Application No. PCT/CN2021/127343, filed Oct. 29, 2021, which claims priority to Chinese Patent Application No. 2020112349432, filed with the China National Intellectual Property Administration on Nov. 8, 2020, the disclosures of which are herein incorporated by their entireties.

FIELD

The disclosure relates to the field of computer and communication technologies, and in particular, to a communications technology.

BACKGROUND

Cloud gaming, also referred to as gaming on demand, is an online gaming technology based on the cloud computing technology. The cloud gaming technology enables a thin client with relatively limited graphics processing and data computing capabilities to run high-quality games. In a cloud game scenario, a game runs in a cloud server rather than a game terminal of a player, and the cloud server renders the game scenario into a video and audio stream, and transfers the video and audio stream to the game terminal of the user through the network. The game terminal of the player does not require a powerful graphics processing and data computing capability, instead, requires only a basic streaming media playback capability and an ability to obtain player input instructions and transmit the player input instructions to the cloud server.

In the cloud game scenario, the cloud server needs to periodically transmit video and audio streams to the game terminal. In similar scenarios such as virtual reality (VR), augmented reality (AR), mixed reality (MR), extended reality (XR), or cinematic reality (CR), periodic transfer of media streams is required. How to prevent congestion and freeze from occurring during the periodic transfer of media streams is a technical problem that urgently needs to be solved.

SUMMARY

Embodiments of the disclosure provide a method, an apparatus, a computer-readable medium, and an electronic device for communication, which may achieve efficient scheduling of interactive service data flows to some extent, and prevent congestion and freeze of the transfer of interactive service data flows, thereby improving the QoS of interactive services.

According to an aspect of example embodiments of the disclosure, a communication method is provided, which is performed by a policy control function (PCF) entity. The communication method includes: receiving a request message of an application function (AF) entity, the request message including a service characteristic of an interactive service data flow, the service characteristic of the interactive service data flow including periodicity information and flow direction information, the periodicity information indicating a data packet transfer period of the interactive service data flow, and the flow direction information indicating a link direction corresponding to the periodicity information; generating a policy and charging control (PCC) rule based on the request message, the PCC rule including a quality of service (QoS) parameter corresponding to the service characteristic of the interactive service data flow; and transmitting, to a session management function (SMF) entity, the PCC rule upon which a QoS configuration file is transmitted from the SMF entity to a radio access network (RAN) side, the QoS configuration file including a QoS flow for the interactive service data flow.

According to an aspect of example embodiments of the disclosure, a communication method is provided, which is performed by an SMF entity. The communication method includes: receiving a PCC rule transmitted by a PCF entity, the PCC rule including a QoS parameter corresponding to a service characteristic of an interactive service data flow, the QoS parameter including periodicity information and flow direction information, the periodicity information indicating a data packet transfer period of the interactive service data flow, and the flow direction information indicating a link direction corresponding to the periodicity information; determining, based on the PCC rule, a QoS flow for transferring the interactive service data flow, and generating a QoS configuration file for transferring the QoS flow, the QoS configuration file including the QoS parameter; and transmitting, to a radio access network (RAN) side, the QoS configuration file based on which the QoS flow is configured at the RAN side and scheduling of user equipment (UE) to transfer an interactive service data packet corresponding to the QoS flow is performed.

According to an aspect of example embodiments of the disclosure, a communication method is provided, which is performed by a RAN device. The communication method includes: receiving a QoS configuration file from an SMF entity, the QoS configuration file including a QoS parameter corresponding to a QoS flow for an interactive service data flow, the QoS parameter including periodicity information and flow direction information, the periodicity information indicating a data packet transfer period of the QoS flow, and the flow direction information indicating a link direction corresponding to the periodicity information; and configuring the QoS flow based on the QoS configuration file, and scheduling user equipment (UE) to transfer an interactive service data packet corresponding to the QoS flow.

According to an aspect of example embodiments of the disclosure, a communication apparatus is provided. The communication apparatus includes at least one memory configured to store program code; and at least one processor configured to read the program code and operate as instructed by the program code, the program code including: first receiving code configured to cause the at least one processor to receive a request message transmitted by an AF entity, the request message including a service characteristic of an interactive service data flow, the service characteristic of the interactive service data flow including periodicity information and flow direction information, the periodicity information indicating a data packet transfer period of the interactive service data flow, and the flow direction information indicating a link direction corresponding to the periodicity information; first generation code configured to cause the at least one processor to generate a PCC rule based on the request message, the PCC rule including a QoS parameter corresponding to the service characteristic of the interactive service data flow; and first transmitting code configured to cause the at least one processor to transmit the PCC rule to an SMF entity, so that the SMF entity transmits a QoS configuration file to a RAN side based on the PCC rule, the QoS configuration file including a QoS flow for the interactive service data flow.

According to an aspect of example embodiments of the disclosure, a communication apparatus is provided. The communication apparatus includes at least one memory configured to store program code; and at least one processor configured to read the program code and operate as instructed by the program code, the program code including: second receiving code configured to cause the at least one processor to receive a PCC rule transmitted by a PCF entity, the PCC rule including a QoS parameter corresponding to a service characteristic of an interactive service data flow, the QoS parameter including periodicity information and flow direction information, the periodicity information indicating a data packet transfer period of the interactive service data flow, and the flow direction information indicating a link direction corresponding to the periodicity information; second generation code configured to cause the at least one processor to determine, based on the PCC rule, a QoS flow for transferring the interactive service data flow, and generate a QoS configuration file for transferring the QoS flow, the QoS configuration file including the QoS parameter; and a second transmitting code configured to cause the at least one processor to transmit the QoS configuration file to a RAN side, so that the RAN side configures the QoS flow based on the QoS configuration file, and schedules user equipment (UE) to transfer an interactive service data packet corresponding to the QoS flow.

According to an aspect of example embodiments of the disclosure, a communication apparatus is provided. The communication apparatus includes at least one memory configured to store program code; and at least one processor configured to read the program code and operate as instructed by the program code, the program code including: third receiving code configured to cause the at least one processor to receive a QoS configuration file from an SMF entity, the QoS configuration file including a QoS parameter corresponding to a QoS flow for an interactive service data flow, the QoS parameter including periodicity information and flow direction information, the periodicity information indicating a data packet transfer period of the QoS flow, and the flow direction information indicating a link direction corresponding to the periodicity information; and processing code configured to cause the at least one processor to configure the QoS flow based on the QoS configuration file, and schedule user equipment (UE) to transfer an interactive service data packet corresponding to the QoS flow.

According to an aspect of the embodiments of the disclosure, a computer-readable medium is provided, storing a computer program, the computer program, when executed by a processor, implementing the communication method based on the foregoing embodiments.

According to an aspect of example embodiments of the disclosure, an electronic device is provided, including: one or more processors; and a storage apparatus, configured to store one or more programs, the one or more programs, when executed by the one or more processors, causing the one or more processors to implement the communication method based on the foregoing embodiments.

According to an aspect of example embodiments of the disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the communication method provided in the various optional embodiments described above.

BRIEF DESCRIPTION OF THE DRAWINGS

FIG. 1 is a schematic diagram of an exemplary system architecture to which the technical solutions of embodiments of the disclosure are applicable.

FIG. 2 is a flowchart of a communication method according to an embodiment of the disclosure.

DETAILED DESCRIPTION

Figure 3:
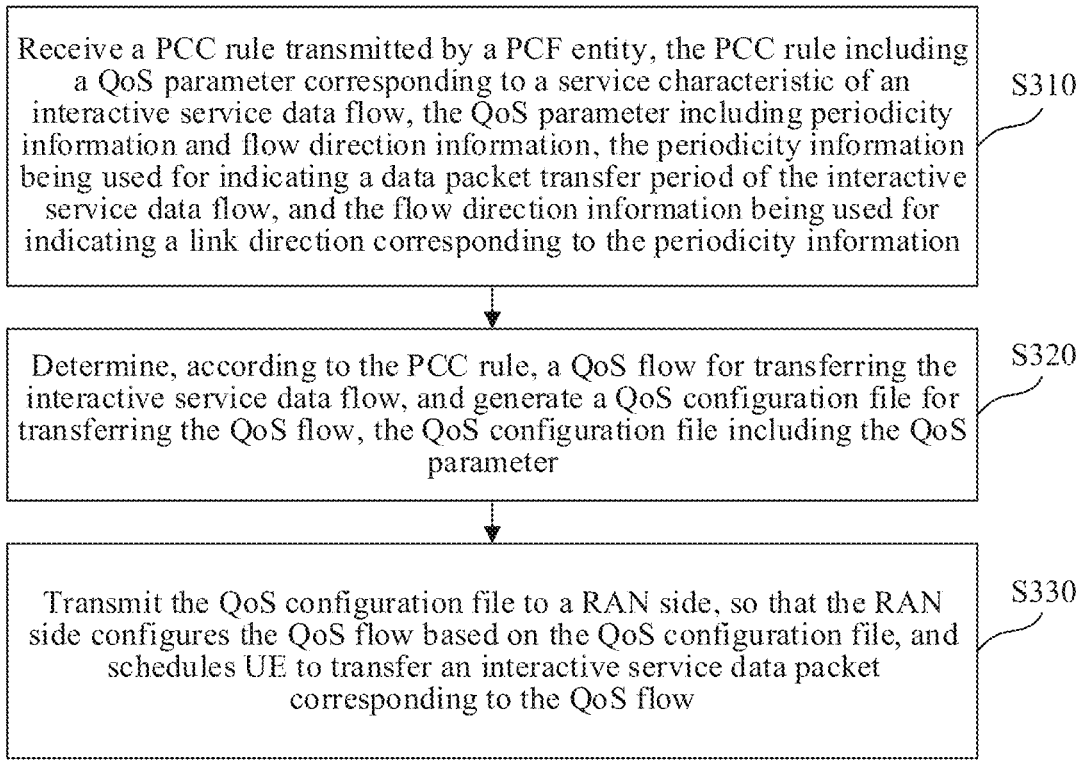
FIG. 3 is a flowchart of a communication method according to an embodiment of the disclosure.

Hereinafter, example embodiments of the disclosure are described with reference to the accompanying drawings.

The term "plurality of" mentioned herein means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

As the 5th-Generation (5G) mobile communication technology develops, many services that require a high data rate and a short delay are widely used. For example, interactive services such as a cloud game service, VR, AR, MR, XR, and CR, which are also referred to as advanced interactive services (AIS) business, are widely used.

FIG. 1 is a schematic diagram of an exemplary system architecture to which the technical solutions of embodiments of the disclosure are applicable. In a cloud game scenario shown in FIG. 1, a cloud server 101 is configured to run a cloud game. The cloud server 101 may render a game picture, code an audio signal and the rendered image, and finally transfers the coded data to each game client through the network. The game client may be user equipment (UE) with a basic streaming media playback capability, a human-computer interaction capability, a communication capability, and the like, such as a smart phone, a tablet computer, a notebook computer, a desktop computer, or a smart television. Alternatively, the game client may be an application program running in a terminal device. Specifically, the game client may decode the coded data transferred by the cloud server 101 to obtain an analog audio and video signal and play the analog audio and video signal.

It is to be understood that FIG. 1 shows only an exemplary system architecture of the cloud game system, and does not limit the specific architecture of the cloud game system. For example, in other embodiments, the cloud game system may include a back-end server for scheduling and the like. In addition, the cloud server 101 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The game client and the cloud server 101 may be directly or indirectly connected in a wired or wireless communication manner. This is not limited in the disclosure.

In the above application scenarios, service data is generally transferred not continuously but periodically, and a transfer period may vary. In this case, preventing the periodic transfer of the service data from congestion and freeze is the key to ensuring the quality of service (QoS) services.

Based on the above, the embodiments of the disclosure provide the following solutions (for description purposes, the technical solutions of the embodiments of the disclosure are described herein in detail in terms of a policy control function (PCF) entity, a session management function (SMF) entity, and a radio access network (RAN) device).

FIG. 2 is a flowchart of a communication method according to an embodiment of the disclosure. The communication method may be performed by the PCF entity. Referring to FIG. 2, the communication method includes at least steps S210 to S230, which are described in detail as follows:

Step S210: Receive a request message transmitted by an application function (AF) entity, the request message including a service characteristic of an interactive service data flow, the service characteristic of the interactive service data flow including periodicity information and flow direction information, the periodicity information being used for indicating a data packet transfer period of the interactive service data flow, and the flow direction information being used for indicating a link direction corresponding to the periodicity information.

In an embodiment of the disclosure, if the AF entity may directly interact with the PCF entity, the PCF entity may receive the request message directly transmitted by the AF entity. If the AF entity needs to interact with the PCF entity through a network exposure function (NEF) entity, the PCF entity may receive the request message from the AF forwarded by the NEF entity.

In an embodiment of the disclosure, the request message including the service characteristic of the interactive service data flow transmitted by the AF entity may be a policy authorization create request (Npcf_PolicyAuthorization-_Create Request). In this case, the policy authorization create request may include a service characteristic of the interactive service data flow provided by the AF entity for the first time. That is to say, when providing the service characteristic of the interactive service data flow for the first time, the AF entity may carry the service characteristic of the interactive service data flow in the policy authorization create request and transmit the policy authorization create request with the service characteristic of the interactive service data flow to the PCF entity.

In an embodiment of the disclosure, the request message including the service characteristic of the interactive service data flow transmitted by the AF entity may be a policy authorization update request (Npcf_PolicyAuthorization-_Update Request). In this case, the policy authorization update request may include a service characteristic corresponding to a new interactive service data flow provided by the AF entity or an updated service characteristic of the previous interactive service data flow. That is to say, when the AF entity needs to add a new interactive service data flow or update the service characteristic of the previous interactive service data flow, the AF entity may carry the service characteristic corresponding to the newly added interactive service data flow or the updated service characteristic of the interactive service data flow in the policy authorization update request and transmit the policy authorization update request with the service characteristic corresponding to the newly added interactive service data flow or the updated service characteristic of the interactive service data flow to the PCF entity.

In an embodiment of the disclosure, the periodicity information included in the service characteristic of the interactive service data flow provided by the AF entity to the PCF entity may be a specific periodicity value, or may be frames per second (FPS) information.

In an example, if the periodicity information included in the service characteristic of the interactive service data flow provided by the AF entity to the PCF entity is the FPS information, the PCF entity may convert the FPS information to a specific periodicity value, and then transmit the periodicity value to the SMF entity. Specifically, the periodicity value is equal to 1000/FPS (ms). For an interactive service data flow in a form of a video stream, the FPS may be, for example, 23.97, 24, 25, 29.97, 30, 48, 50, 59.97, 60, 72, 100, 119.88, 120, or the like. For an interactive service data flow in a form of a voice stream, the FPS may be, for example, 20, 40, 80, or the like.

In an example, if the periodicity information included in the service characteristic of the interactive service data flow provided by the AF entity to the PCF entity is the FPS information, the PCF entity may alternatively directly transmit the FPS information to the SMF entity without converting the FPS information to a specific periodicity value. In this case, the SMF entity may convert the FPS information to a specific periodicity value in the manner in the above example.

In an embodiment of the disclosure, the flow direction information included in the service characteristic of the interactive service data flow may indicate that a flow direction is uplink (UL), downlink (DL), or UL+DL.

Step S220: Generate a policy and charging control (PCC) rule according to the request message, the PCC rule including a QoS parameter corresponding to the service characteristic of the interactive service data flow.

In an embodiment of the disclosure, the PCC rule may be applied to binding of a QoS flow, so as to implement transfer of an interactive service data flow through a QoS flow.

Step S230: Transmit the PCC rule to an SMF entity, so that the SMF entity transmits a QoS configuration file to a RAN side based on the PCC rule, the QoS configuration file including a QoS flow for the interactive service data flow.

In an embodiment of the disclosure, the PCF entity may transmit the PCC rule to the SMF entity by using a session management (SM) policy control update notification request (that is, Npcf_SMPolicyControl_UpdateNotify Request), an SM policy control update response (that is, Npcf_SMPolicyControl_Update Response), or an SM policy control create response (that is, Npcf_SMPolicyControl_Create Response). However, in a different case, the PCC rule may be transmitted in a different manner.

Specifically, if a request transmitted by the AF entity causes the service characteristic (that is, the periodicity information and the flow direction information) of the interactive service data flow to change, the PCF entity needs to transmit the PCC rule to the SMF entity by using the SM policy control update notification request. However, when the AF entity provides the service characteristic of the interactive service data flow to the PCF entity for the first time, the PCF entity needs to provide the PCC rule to the SMF entity by using the SM policy control create response.

If a request transmitted by UE causes the service characteristic (for example, the periodicity information) of the interactive service data flow to change, for example, the UE is a high-speed network camera that may be configured to transfer video data to the service server, the UE may transmit an updated service characteristic (for example, updated periodicity information) to the SMF entity by using a non-access stratum (NAS) parameter, and then the SMF entity may report the parameter to the PCF entity by using the SM policy control update request (that is, Npcf_SMPolicyControl_Update Request). After the PCF entity agrees to the update of the service characteristic, the PCF may return the parameter to the SMF entity by using the SM policy control update response.

FIG. 2 illustrates the communication method in this embodiment of the disclosure in terms of the PCF entity. In the following, the technical solutions in the embodiments of the disclosure are further described in terms of the SMF entity.

FIG. 3 is a flowchart of another communication method according to an embodiment of the disclosure. The communication method may be performed by the SMF entity. Referring to FIG. 3, the communication method includes at least step S310 to step S330, which are described in detail as follows:

S310: Receive a PCC rule transmitted by a PCF entity, the PCC rule including a QoS parameter corresponding to a service characteristic of an interactive service data flow, the QoS parameter including periodicity information and flow direction information, the periodicity information being used for indicating a data packet transfer period of the interactive service data flow, and the flow direction information being used for indicating a link direction corresponding to the periodicity information.

In an embodiment of the disclosure, the SMF entity may receive the PCC rule by receiving the SM policy control update notification request, the SM policy control update response, or the SM policy control create response transmitted by the PCF entity.

In an embodiment of the disclosure, the periodicity information included in the QoS parameter corresponding to the service characteristic of the interactive service data flow in the PCC rule may be a specific periodicity value, or may be FPS information. If the periodicity information is the FPS information, the SMF entity may convert the FPS information to a specific periodicity value. Specifically, the periodicity value is equal to 1000/FPS (ms).

In an embodiment of the disclosure, the flow direction information included in the service characteristic of the interactive service data flow may indicate that a flow direction is UL, DL, or UL+DL.

S320: Determine, according to the PCC rule, a QoS flow for transferring the interactive service data flow, and generate a QoS configuration file for transferring the QoS flow, the QoS configuration file including the QoS parameter.

In an embodiment of the disclosure, after receiving the PCC rule, the SMF entity maps the interactive service data flow to the QoS flow (that is, creates a QoS Flow carrying the interactive service data flow) based on the QoS parameter corresponding to the service characteristic of the interactive service data flow included in the PCC rule, for example, the periodicity information. The generated QoS configuration file is applied to the newly created QoS flow.

S330: Transmit the QoS configuration file to a RAN side, so that the RAN side configures the QoS flow based on the QoS configuration file, and schedules UE to transfer an interactive service data packet corresponding to the QoS flow.

In an embodiment of the disclosure, the SMF entity may generate a communication message transfer request including the QoS configuration file (that is, Namf_Communication_N1N2MessageTransfer request), and then transmit the communication message transfer request to an access and mobility management function (AMF) entity. Then the AMF entity carries the QoS configuration file in a protocol data unit (PDU) session resource modification request (PDUSessionResourceModify Request), and transmits the PDU session resource modification request with the QoS configuration file to the RAN side. Moreover, the SMF entity transmits identification information of the QoS flow to the RAN side.

FIG. 3 illustrates the communication method in this embodiment of the disclosure in terms of the SMF entity. In the following, the technical solutions in the embodiments of the disclosure are further described in terms of the RAN device.

Figure 4:
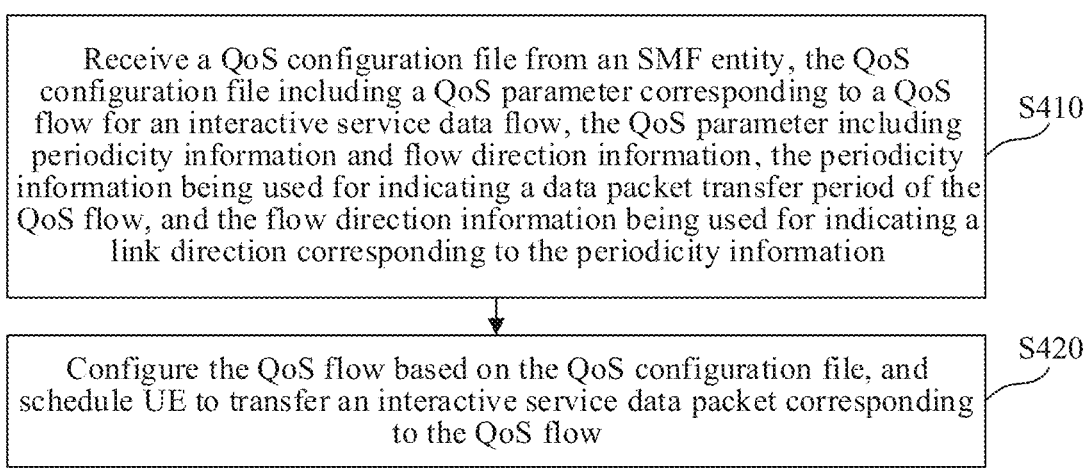
FIG. 4 is a flowchart of a communication method according to an embodiment of the disclosure.

FIG. 4 is a flowchart of another communication method according to an embodiment of the disclosure. The communication method may be performed by the RAN device (for example, a base station). Referring to FIG. 4, the communication method includes at least step S410 to step S420, which are described in detail as follows:

Step S410: Receive a QoS configuration file from an SMF entity, the QoS configuration file including a QoS parameter corresponding to a QoS flow for an interactive service data flow, the QoS parameter including periodicity information and flow direction information, the periodicity information being used for indicating a data packet transfer period of the QoS flow, and the flow direction information being used for indicating a link direction corresponding to the periodicity information.

In an embodiment of the disclosure, the RAN device may receive the QoS configuration file from the SMF entity forwarded by the AMF entity, as described in the above embodiment. The flow direction information included in the service characteristic of the interactive service data flow may indicate that a flow direction is UL, DL, or UL+DL.

Step S420: Configure the QoS flow based on the QoS configuration file, and schedule UE to transfer an interactive service data packet corresponding to the QoS flow.

In an embodiment of the disclosure, the QoS configuration file includes identification information, that is, ID information of the QoS flow. After the RAN device acquires the identification information of the QoS flow and the QoS configuration file, if it is found that the identification information of the QoS flow is new (a message for establishing a PDU session for the first time is named a PDU session resource setup (that is, N2 PDUSessionResourceSetup)

request, and then a new QoS flow is added (created) through the PDU session resource modification (N2 PDUSessionResourceModify) request), it indicates that a new QoS flow is created. If it is found that the identification information of the QoS flow already exists, it indicates that the QoS flow is obtained by modifying the existing QoS flow. Regardless of whether PDU session resource setup or PDU session resource modification is used, radio resources and scheduling manners required for the QoS flow are reconfigured according to the QoS configuration file.

The RAN device may perform scheduling in a semi-persistent scheduling (SPS) manner. The SPS mainly means configuring transfer parameters through high-level signaling, to indicate periodic transfer of an SPS physical downlink shared channel (PDSCH). That is, after application for a resource once, the corresponding resource is allocated to a user within a time period according to the cycle indicated by the high-level signaling. Since the SPS requires transmission of only one physical downlink control channel (PDCCH), and subsequently data may be transferred periodically, low signaling overheads are required, making the SPS very suitable for periodic small packet transfer during DL ultra-reliable and low latency communication (URLLC).

In 4G, the SPS is mainly applied to scheduling of voice service data in Voice over Long-Term Evolution (VoLTE) services. This is because voice services are periodic. The SPS is also defined in 5G standards such as TS38.213 and TS38.331, but how to obtain a period is not clearly specified in the standards. Therefore, the embodiments of the disclosure provide an innovative way of setting the period in the SPS by using the periodicity information provided in the QoS configuration file (the periodicity information is a data packet transfer period of the interactive service data flow). In addition, in 5G, the SPS is applicable not only to voice, but also to cloud gaming, VR, AR, MR, XR, and CR to transfer video streams and/or voice streams periodically. Since the SPS has the characteristic "one allocation for multiple use", the scheduling signaling may be significantly reduced for a 5G base station. In addition, since the arrival of the periodic data packets of the interactive service data flow may be learned in advance, relevant radio resources may be allocated in advance, which avoids a waste of time for allocating the radio resources after detection of the arrival of the data. In this way, not only the capacity of the base station is increased, but also the time delay during data transfer is reduced. It may be learned that, in this embodiment of the disclosure, the scheduling efficiency of the SPS of the 5G base station may be further enhanced by using the periodicity parameter value provided in the QoS configuration file.

In an embodiment of the disclosure, if the flow direction information included in the QoS configuration file is used for indicating that the periodicity information corresponds to service data in a DL direction, during scheduling (for example, the scheduling may be the SPS), the RAN device may reserve, for the UE according to the periodicity information, a first radio resource corresponding to a QoS flow for receiving a DL interactive service data packet, so as to schedule the UE to receive, through the first radio resource, the DL interactive service data packet transferred by the QoS flow. Based on the above, if the flow direction information included in the QoS configuration file is not only used for indicating that the periodicity information corresponds to the service data in the DL direction, and but also used for indicating that the periodicity information corresponds to a receipt confirmation message in a UL direction, during scheduling, the RAN may further reserve, for the UE according to the periodicity information, a second radio resource corresponding to a QoS flow for the DL interactive service data packet for receiving the receipt confirmation message, so as to schedule the UE to feed back the receipt confirmation message through the second radio resource.

In an embodiment of the disclosure, if the flow direction information included in the QoS configuration file is used for indicating that the periodicity information corresponds to service data in a UL direction, during scheduling (for example, the scheduling may be the SPS), the RAN device may reserve, for the UE according to the periodicity information, a third radio resource corresponding to a QoS flow for transmitting a UL interactive service data packet, so as to schedule the UE to transmit the UL interactive service data packet through the third radio resource.

The technical solutions of the embodiments of the disclosure have been described above in terms of the PCF entity, the SMF entity, and the RAN device respectively. In the following, the implementation details of the technical solutions of the embodiments of the disclosure are described in detail in terms of interaction between the above entities and device with reference to FIG. 5 to FIG. 8.

Figure 5:
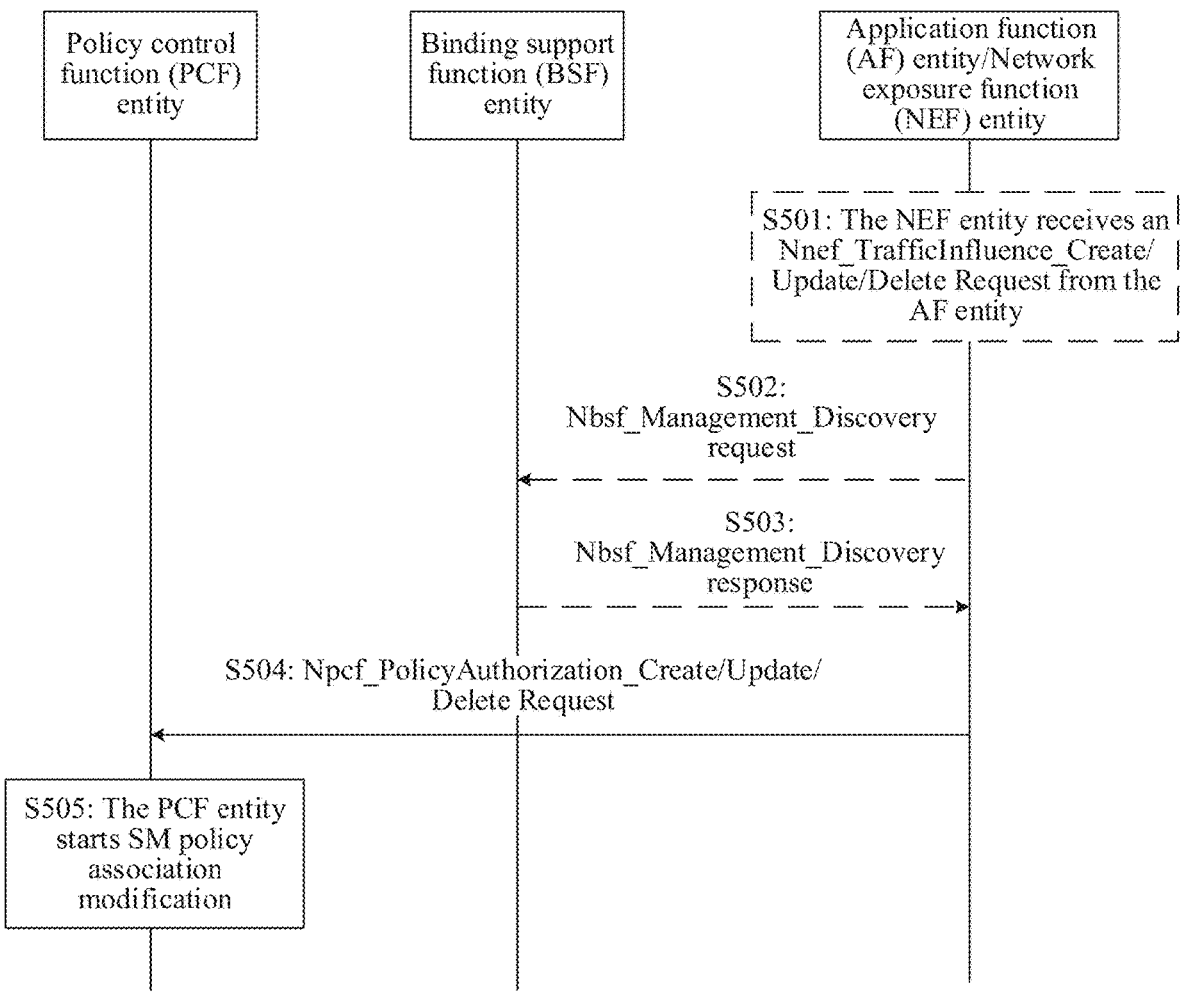
FIG. 5 is a flowchart of interaction between an application function (AF) entity and a policy control function (PCF) entity according to an embodiment of the disclosure.

FIG. 5 is a flowchart of interaction between an AF entity and a PCF entity according to an embodiment of the disclosure. As shown in FIG. 5, the interaction between the AF entity and the PCF entity may include the following steps S501-S505:

Step S501: If the AF entity transmits a request message to the PCF entity through the NEF entity, the AF entity transmits, to the NEF entity, an Nnef_TrafficInfluence_Create/Update/Delete Request for a single UE address. When the NEF entity receives the request message from the AF entity, the NEF entity ensures authorization control, and maps the information provided by the AF entity to information required for a 5G core network.

If it is determined according to the entity deployment status of the AF that the AF entity may directly transmit the request to the PCF, the entity may skip step S501.

Step S502: If a locally configured PCF address is not available on the AF/NEF entity, the AF/NEF entity uses an Nbsf_Management_Discovery request (a UE identifier) to find a relevant address of the PCF entity. Specifically, the AF/NEF entity finds a binding support function (BSF) entity according to the local configuration or by using an NF repository function (NRF) entity. The UE identifier may be an IP address of the UE or a generic public subscription identifier (GPSI) of the UE.

Step S503: The BSF entity transmits an Nbsf_Management_Discovery response message to the AF/NEF entity, the Nbsf_Management_Discovery response message providing the PCF address to the AF/NEF entity.

Step S504: If step S501 is performed, the NEF entity transmits an Npcf_PolicyAuthorization_Create/Update/Delete Request to the PCF entity to transfer the request of the AF entity. If the AF entity may directly transmit the request to the PCF entity, the AF entity transmits the Npcf_PolicyAuthorization_Create/Update/Delete Request to the PCF entity.

In an embodiment of the disclosure, the Npcf_Policy Authorization_Create Request transmitted by the AF/NEF entity may include the service characteristic of the interactive service data flow in the embodiments of the disclosure. In this case, the Npcf_Policy Authorization_Create Request includes the service characteristic of the interactive service data flow provided by the AF for the first time. That is to say, when providing the service characteristic of the interactive service data flow for the first time, the AF entity carries the service characteristic of the interactive service data flow in the Npcf_Policy Authorization_Create Request and transmits the Npcf_Policy Authorization_Create Request with the service characteristic of the interactive service data flow to the PCF entity (directly or through the NEF entity).

In an embodiment of the disclosure, the Npcf_Policy Authorization_Update Request transmitted by the AF/NEF entity may include the service characteristic of the interactive service data flow in the embodiments of the disclosure. In this case, the Npcf_Policy Authorization_Update Request includes a service characteristic corresponding to a new interactive service data flow provided by the AF entity or an updated service characteristic of the previous interactive service data flow. That is to say, when the AF entity adds a new interactive service data flow or needs to update the service characteristic of the previous interactive service data flow, the AF entity carries the service characteristic corresponding to the newly added interactive service data flow or the updated service characteristic of the interactive service data flow in the Npcf_Policy Authorization_Update Request and transmits the Npcf_Policy Authorization_Update Request with the service characteristic corresponding to the newly added interactive service data flow or the updated service characteristic of the interactive service data flow to the PCF entity (directly or through the NEF entity).

In an embodiment of the disclosure, the periodicity information included in the service characteristic of the interactive service data flow (newly added or updated) provided by the AF entity may be a specific periodicity value, or may be FPS information. If the periodicity information included in the service characteristic of the interactive service data flow provided by the AF entity is the FPS information, the PCF entity may convert the FPS information to a specific periodicity value, and then transmit the periodicity value to the SMF entity through the PCC rule.

Step S505: The PCF entity updates the SMF entity by using a corresponding new PCC rule, and the PCF entity starts an SM policy association modification program. When receiving the PCC rule from the PCF entity, the SMF entity may properly reconfigure a user plane of the PDU session and a 5G base station corresponding to the PDU session timely. For a specific process, refer to Section 4.3.6.4 of the 3GPP protocol TS23.502.

Figure 6:
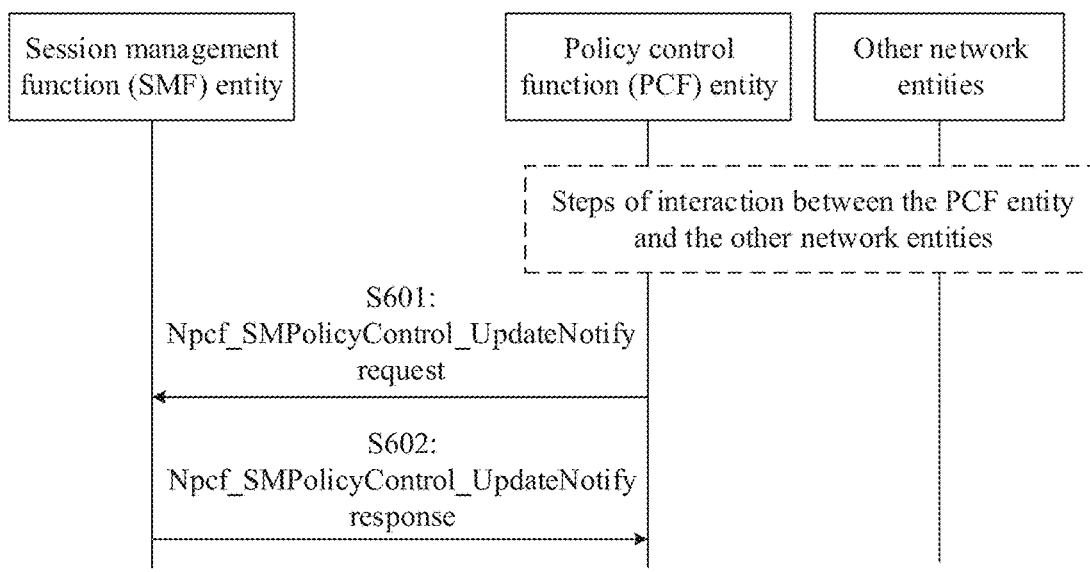
FIG. 6 is a flowchart of interaction between a PCF entity and a session management function (SMF) entity according to an embodiment of the disclosure.

FIG. 6 is a flowchart of interaction between a PCF entity and an SMF entity according to an embodiment of the disclosure. As shown in FIG. 6, the interaction between the PCF entity and the SMF entity may include the following steps S601-S602:

Step S601: After acquiring the service characteristic of the interactive service data flow through interaction with the other network entities (such as the AF entity), the PCF entity generates a PCC rule based on the service characteristic, the PCC rule including a QoS parameter corresponding to the service characteristic of the interactive service data flow, and then carries the PCC rule in an Npcf_SMPolicyControl_UpdateNotify request and transmits the Npcf_SMPolicyControl_UpdateNotify request with the PCC rule to the SMF entity.

As described above, the periodicity information included in the service characteristic of the interactive service data flow acquired by the PCF entity may be a specific periodicity value, or may be FPS information. If the periodicity information included in the service characteristic of the interactive service data flow acquired by the PCF entity is the FPS information, the PCF entity may convert the FPS information to a specific periodicity value, and then transmit the periodicity value to the SMF entity through the PCC rule.

For a specific conversion process, refer to the above embodiment, and the details are not repeated herein.

Step S602: After receiving the Npcf_SMPolicyControl_UpdateNotify request, the SMF entity feeds back an Npcf_SMPolicyControl_UpdateNotify response to the PCF entity. For other contents not shown and described in FIG. 6, refer to Section 4.16.5.2 of the 3GPP protocol TS23.502.

In the interaction process shown in FIG. 6, if the request transmitted by the AF entity causes the service characteristic (that is, the periodicity information and the flow direction information) of the interactive service data flow to change, the PCF entity transmits the PCC rule to the SMF entity by using the Npcf_SMPolicyControl_UpdateNotify Request. When the AF entity provides the service characteristic of the interactive service data flow to the PCF entity for the first time, the PCF entity provides the PCC rule to the SMF entity by using the Npcf_SMPolicyControl_Create Response.

Figure 7:
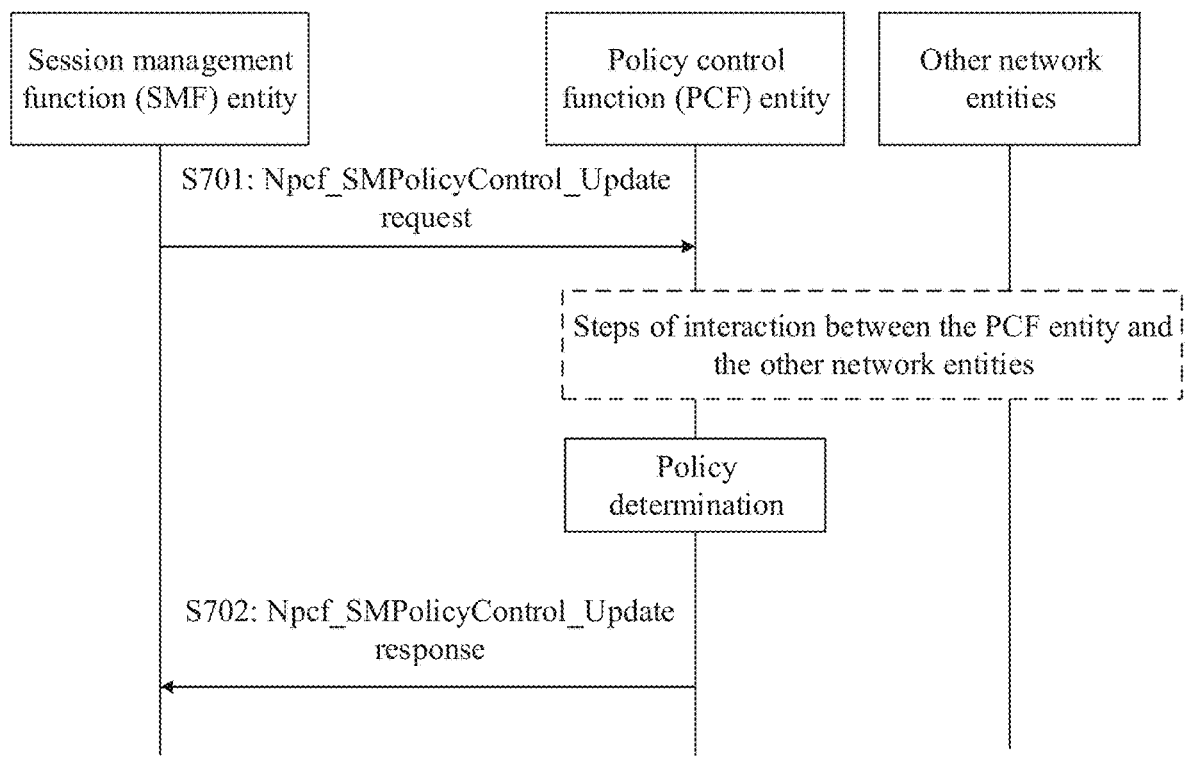
FIG. 7 is a flowchart of interaction between a PCF entity and an SMF entity according to an embodiment of the disclosure.

In an embodiment of the disclosure, the UE may transmit a request to initiate modification of the service characteristic (for example, the periodicity information) of the interactive service data flow. A specific process is shown in FIG. 7, which includes the following steps S701-S702:

Step S701: After receiving the updated service characteristic (for example, the updated periodicity information) transmitted by the UE through the NAS parameter, the SMF entity transmits an Npcf_SMPolicyControl_Update Request to the PCF entity.

Step S702: After receiving the Npcf_SMPolicyControl_Update Request transmitted by the SMF entity, the PCF entity performs interaction with other network entities and performs decision making, and then transmits an Npcf_SMPolicyControl_Update Response to the SMF entity, so as to return the confirmed parameter to the SMF entity. For other contents not shown and described in FIG. 7, refer to Section 4.16.5.1 of the 3GPP protocol TS23.502.

Figure 8:
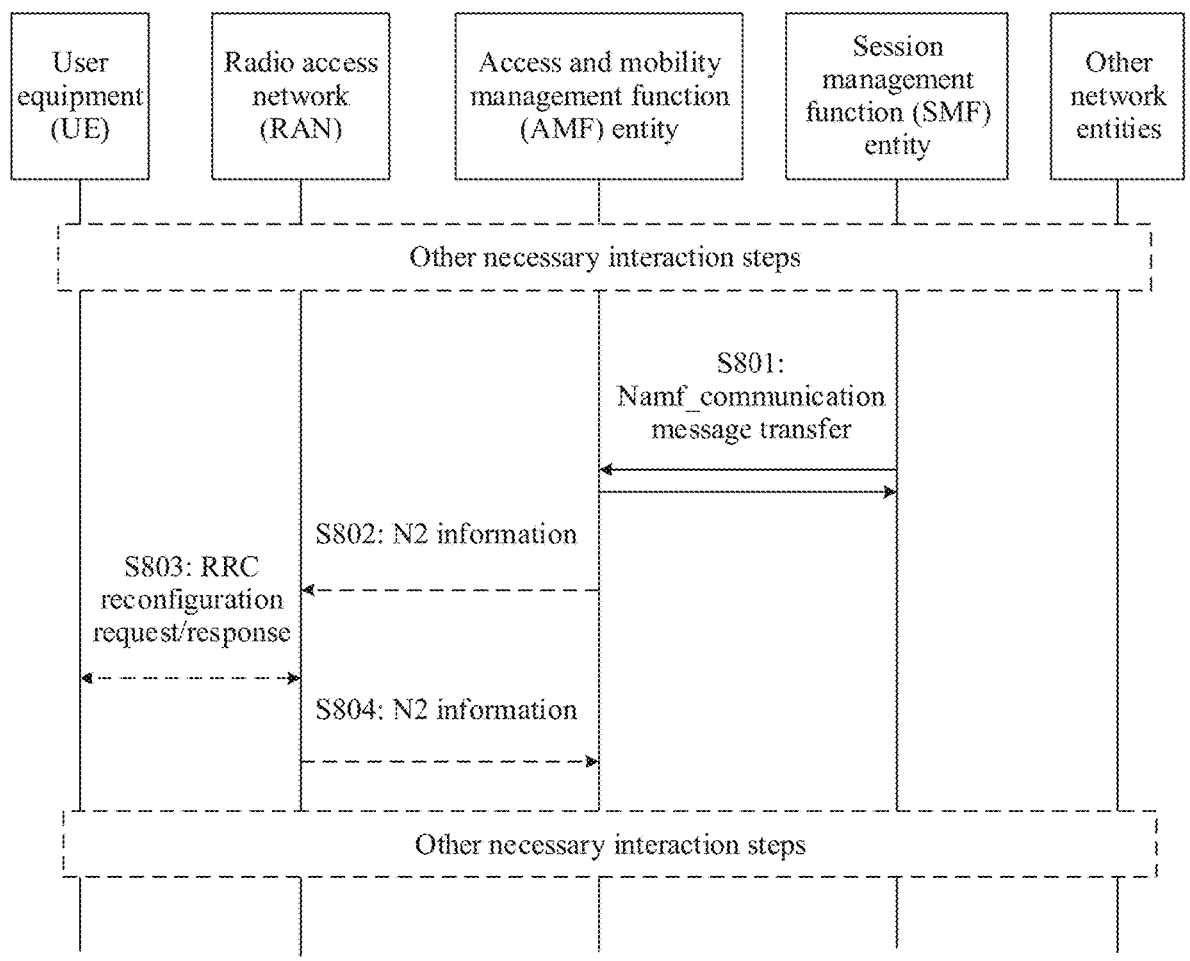
FIG. 8 is a flowchart of interaction between an SMF entity and a radio access network (RAN) device according to an embodiment of the disclosure.

FIG. 8 is a flowchart of interaction between an SMF entity and a RAN device according to an embodiment of the disclosure. As shown in FIG. 8, the interaction between the SMF entity and the RAN device may include the following steps S801-804:

Step S801. The SMF entity and the AMF entity perform interaction of Namf_communication message transfer. Specifically, after acquiring the PCC rule, the SMF entity determines a QoS flow for transferring the interactive service data flow, and generates a QoS configuration file for transferring the QoS flow. After generating the QoS configuration file, the SMF entity generates a Namf_communication message transfer request (that is, Namf_Communication_N1N2MessageTransfer request) including the QoS configuration file, and then transmits the Namf_communication message transfer request to the AMF entity, and the AMF entity returns a Namf_communication message transfer response (that is, Namf_Communication_N1N2MessageTransfer response).

Step S802. The AMF entity transmits N2 information to the RAN device. Specifically, the AMF entity carries the QoS configuration file in a PDU session resource modification request (N2 PDUSessionResourceModify Request), and transmits the PDU session resource modification request with the QoS configuration file to the RAN device.

Step S803. The RAN device and the UE perform a radio resource control (RRC) reconfiguration process.

In an embodiment of the disclosure, the RAN device may schedule the UE through the SPS. Specifically, the RAN device may set the period in the SPS by using the received periodicity information of the QoS configuration file from the SMF entity (the periodicity information is the data packet transfer period of the interactive service data flow). Since the SPS has the characteristic "one allocation for multiple use", the scheduling signaling may be significantly reduced for a 5G base station. In addition, since the arrival time of the periodic data packets of the interactive service data flow may be learned in advance, relevant radio resources may be allocated in advance, which avoids a waste of time for allocating the radio resources after detection of the arrival of the data. In this way, not only the capacity of the base station is increased, but also the time delay during data transfer is reduced. It may be learned that, in this embodiment of the disclosure, the scheduling efficiency of the SPS of the 5G base station may be further enhanced by using the periodicity parameter value provided in the QoS configuration file.

Step S804: The RAN device transmits a confirmation message for the N2 information to the AMF entity, that is, the RAN device transmits a PDU session resource modification response (N2 PDUSessionResourceModify Response) to the AMF entity. For other contents not shown and described in FIG. 8, refer to Section 4.3.3.2 of the 3GPP protocol TS23.502.

The interaction between the various entities in the disclosure has been described above. According to the technical solutions of the embodiments of the disclosure, the UE may be scheduled to transfer the interactive service data packet based on the service characteristic of the interactive service data flow, that is, the periodicity information and the flow direction information, so that efficient scheduling may be realized based on the service characteristic of the interactive service data flow, thereby avoiding congestion and freeze of the transfer of the interactive service data flow, and improving the QoS of interactive services.

The following describes the apparatus embodiments of the disclosure, which may be configured to perform the communication method in the foregoing embodiments of the disclosure. For details not disclosed in the apparatus embodiments of the disclosure, reference is made to the embodiments of the foregoing communication method of the disclosure.

Figure 9:
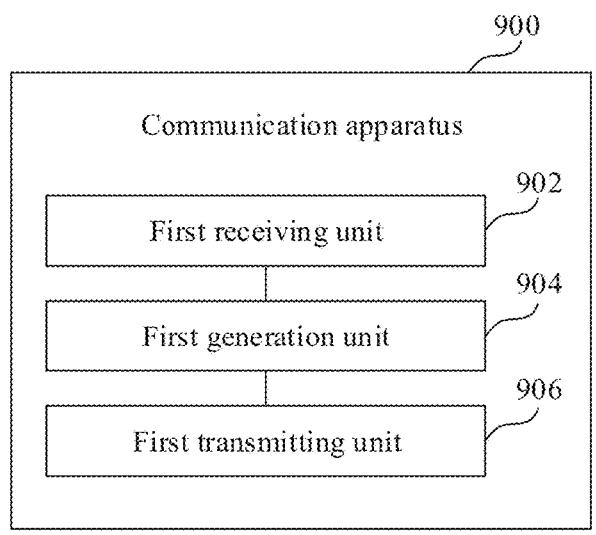
FIG. 9 is a block diagram of a communication apparatus according to an embodiment of the disclosure.

FIG. 9 is a block diagram of a communication apparatus according to an embodiment of the disclosure. The communication apparatus may be disposed in the PCF entity.

Referring to FIG. 9, a communication apparatus 900 according to an embodiment of the disclosure includes a first receiving unit 902, a first generation unit 904, and a first transmitting unit 906.

The first receiving unit 902 is configured to receive a request message transmitted by an AF entity, the request message including a service characteristic of an interactive service data flow, the service characteristic of the interactive service data flow including periodicity information and flow direction information, the periodicity information being used for indicating a data packet transfer period of the interactive service data flow, and the flow direction information being used for indicating a link direction corresponding to the periodicity information. The first generation unit 904 is configured to generate a PCC rule according to the request message, the PCC rule including a QoS parameter corresponding to the service characteristic of the interactive service data flow. The first transmitting unit 906 is configured to transmit the PCC rule to an SMF entity, so that the SMF entity transmits a QoS configuration file to a RAN side based on the PCC rule, the QoS configuration file including a QoS flow for the interactive service data flow.

In some embodiments of the disclosure, based on the above solution, the first receiving unit 902 is configured to receive the request message directly transmitted by the AF entity; or receive the request message from the AF entity forwarded by an NEF entity.

In some embodiments of the disclosure, based on the above solution, the request message transmitted by the AF entity is a policy authorization create request or a policy authorization update request, the policy authorization create request including a service characteristic of the interactive service data flow provided by the AF entity for the first time; and the policy authorization update request including an updated service characteristic of the interactive service data flow provided by the AF entity.

In some embodiments of the disclosure, based on the above solution, the first transmitting unit 906 is configured to: generate an SM policy control update notification request, the SM policy control update notification request including the PCC rule; and transmit the SM policy control update notification request to the SMF entity; or generate an SM policy control update response, the SM policy control update response including the PCC rule; and transmit the SM policy control update response to the SMF entity; or generate an SM policy control create response, the SM policy control create response including the PCC rule; and transmit the SM policy control create response to the SMF entity.

Figure 10:
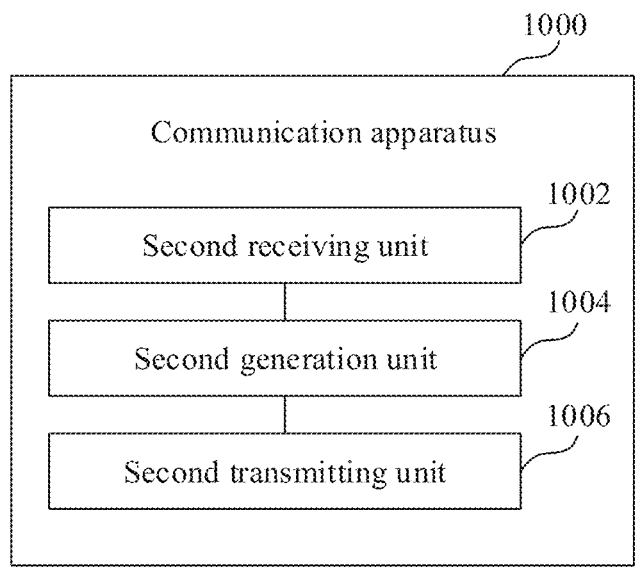
FIG. 10 is a block diagram of a communication apparatus according to an embodiment of the disclosure.

FIG. 10 is a block diagram of a communication apparatus according to an embodiment of the disclosure. The communication apparatus may be disposed in the SMF entity.

Referring to FIG. 10, a communication apparatus 1000 according to an embodiment of the disclosure includes a second receiving unit 1002, a second generation unit 1004, and a second transmitting unit 1006.

The second receiving unit 1002 is configured to receive a PCC rule transmitted by a PCF entity, the PCC rule including a QoS parameter corresponding to a service characteristic of an interactive service data flow, the QoS parameter including periodicity information and flow direction information, the periodicity information being used for indicating a data packet transfer period of the interactive service data flow, and the flow direction information being used for indicating a link direction corresponding to the periodicity information. The second generation unit 1004 is configured to: determine, according to the PCC rule, a QoS flow for transferring the interactive service data flow, and generate a QoS configuration file for transferring the QoS flow, the QoS configuration file including the QoS parameter. The second transmitting unit 1006 is configured to transmit the QoS configuration file to a RAN side, so that the RAN side configures the QoS flow based on the QoS configuration file, and schedules UE to transfer an interactive service data packet corresponding to the QoS flow.

In some embodiments of the disclosure, based on the above solution, the second transmitting unit 1006 is configured to: generate a communication message transfer request, the communication message transfer request including the QoS configuration file; and transmit the communication message transfer request to an AMF entity, so that the AMF entity transmits a PDU session resource modification request including the QoS configuration file to the RAN side.

Figure 11:
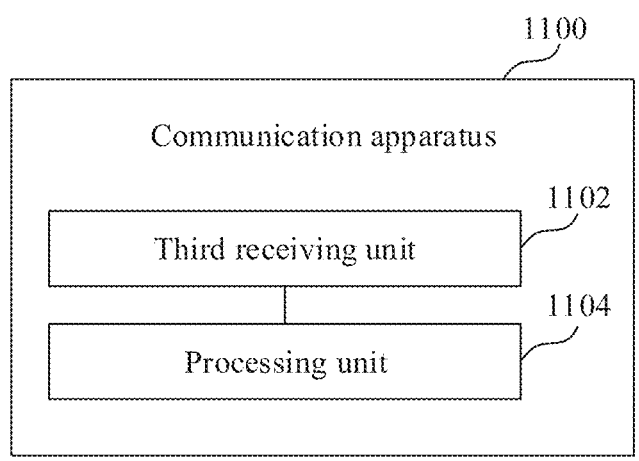
FIG. 11 is a block diagram of a communication apparatus according to an embodiment of the disclosure.

FIG. 11 is a block diagram of a communication apparatus according to an embodiment of the disclosure. The communication apparatus may be disposed in a RAN device (such as a base station).

Referring to FIG. 11, a communication apparatus 1100 according to an embodiment of the disclosure includes a third receiving unit 1102 and a processing unit 1104.

The third receiving unit 1102 is configured to receive a QoS configuration file from an SMF entity, the QoS configuration file including a QoS parameter corresponding to a QoS flow for an interactive service data flow, the QoS parameter including periodicity information and flow direction information, the periodicity information being used for indicating a data packet transfer period of the QoS flow, and the flow direction information being used for indicating a link direction corresponding to the periodicity information. The processing unit 1104 is configured to configure the QoS flow based on the QoS configuration file, and schedule UE to transfer an interactive service data packet corresponding to the QoS flow.

In some embodiments of the disclosure, based on the above solution, the processing unit 1104 is configured to configure a radio resource corresponding to the QoS flow, in a case that the flow direction information included in the QoS configuration file is used for indicating that the periodicity information corresponds to service data in a DL direction, a first radio resource being reserved for the UE according to the periodicity information, so as to schedule the UE to receive, through the first radio resource, a DL interactive service data packet transferred by the QoS flow.

In some embodiments of the disclosure, based on the above solution, the processing unit 1104 is configured to: reserve a second radio resource for the UE according to the periodicity information in a case that the flow direction information included in the QoS configuration file is used for indicating that the periodicity information corresponds to service data in the DL direction and corresponds to a receipt confirmation message in a UL direction, so as to schedule the UE to feed back a receipt confirmation message for the QoS flow for the interactive service data through the second radio resource.

In some embodiments of the disclosure, based on the above solution, the processing unit 1104 is configured to reserve a third radio resource for the UE according to the periodicity information in a case that the flow direction information included in the QoS configuration file is used for indicating that the periodicity information corresponds to service data in a UL direction, so as to schedule the UE to transmit a UL interactive service data packet through the third radio resource.

Figure 12:
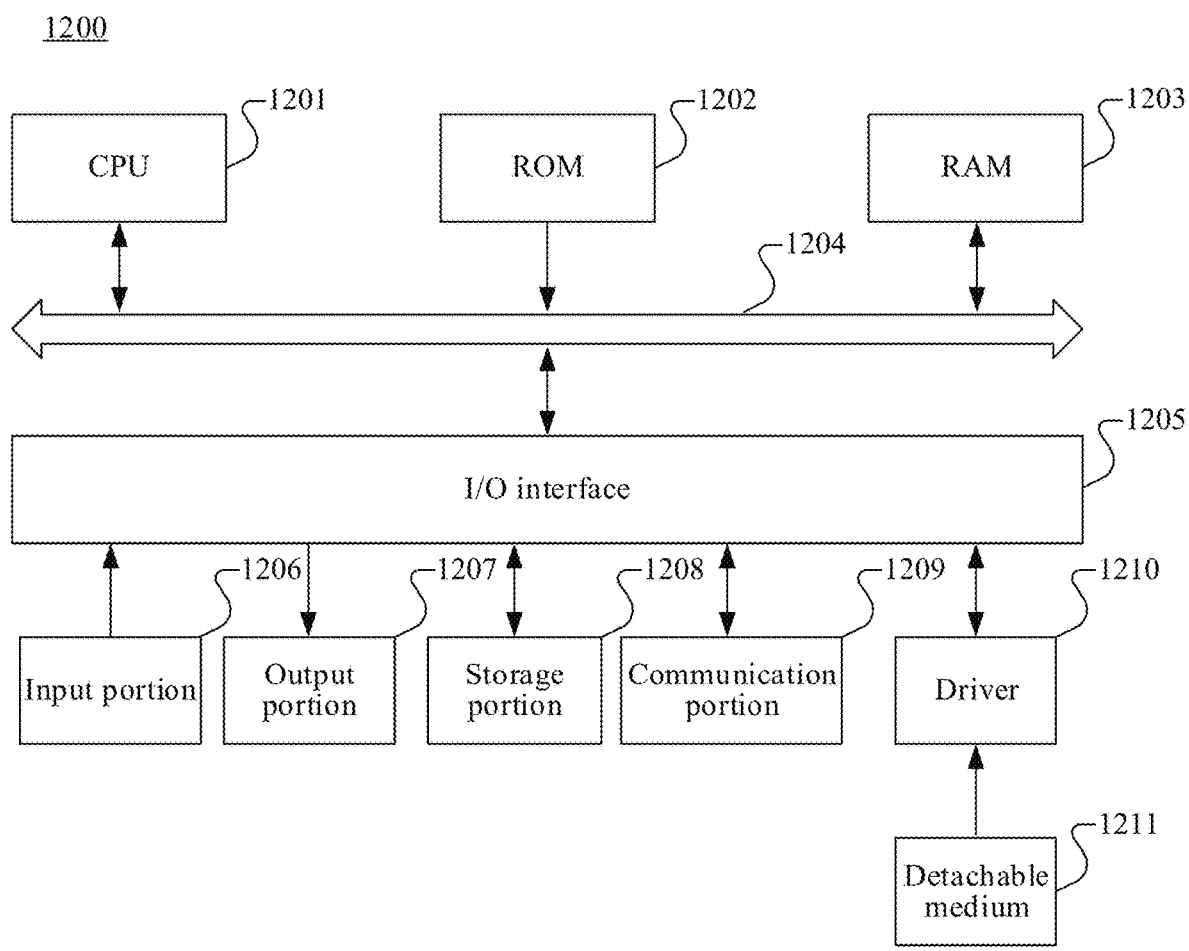
FIG. 12 is a schematic structural diagram of a computer system adapted to implement an electronic device according to an embodiment of the disclosure.

FIG. 12 is a schematic structural diagram of a computer system adapted to implement an electronic device according to an embodiment of the disclosure.

The computer system 1200 of the electronic device shown in FIG. 12 is merely an example, and does not constitute any limitation on functions and use ranges of the embodiments of the disclosure.

As shown in FIG. 12, the computer system 1200 includes a central processing unit (CPU) 1201, which may execute various appropriate actions and processing according to a program stored in a read-only memory (ROM) 1202 or a program loaded from a storage part 1208 to a random access memory (RAM) 1203, such as performing the methods described in the foregoing embodiments. The RAM 1203 further stores various programs and data required for operating the system. The CPU 1201, the ROM 1202, and the RAM 1203 are connected to each other through a bus 1204. An input/output (I/O) interface 1205 is also connected to the bus 1204. The following members are connected to the I/O interface 1205: an input portion 1206 including a keyboard, a mouse, and the like; an output portion 1207 including, such as, a cathode ray tube (CRT), a liquid crystal display (LCD), and a speaker; a storage part 1208 including a hard disk, or the like; and a communication part 1209 including a network interface card such as a local area network (LAN) card, a modem, or the like. The communication part 1209 performs communication processing by using a network such as the Internet. A drive 1210 is also connected to the I/O interface 1205 as required. A removable medium 1211, such as a disk, an optical disc, a magneto-optical disc, or a semiconductor memory, is installed on the drive 1210 as required, so that a computer program read from the removable medium 1211 is installed in the storage part 1208 as required.

Particularly, according to an embodiment of the present application, the processes described above by referring to the flowcharts may be implemented as computer software programs. For example, an embodiment of the disclosure includes a computer program product. The computer program product includes a computer program stored in a computer-readable medium. The computer program includes a computer program used for performing a method shown in the flowchart. In such an embodiment, by using the communication part 1209, the computer program may be downloaded and installed from a network, and/or installed from the removable medium 1211. When the computer program is executed by the CPU 1201, the various functions defined in the system of the disclosure are executed.

The computer-readable medium shown in the embodiments of the disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, an apparatus, or a device. In the disclosure, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the disclosure may be implemented in a software manner, or may be implemented in a hardware manner, and the unit described may also be set in a processor. Names of the units do not constitute a limitation on the units in a specific case.

In another aspect, the disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of the disclosure, the features and functions of two or more modules or units described above may be specifically implemented in one module or unit. Conversely, features and functions of one module or unit described above may be further divided into a plurality of modules or units for implementation.

In the technical solutions provided in some embodiments of the disclosure, the AF entity transmits, to the PCF entity, the request message including the service characteristic of the interactive service data flow, the service characteristic including the periodicity information and the flow direction information, and the PCF entity generates the PCC rule including the QoS parameter based on the request message, and transmits the PCC rule to the SMF entity, and the SMF entity transmits, to the RAN device, the QoS configuration file including the QoS parameter corresponding to the QoS flow for the interactive service data flow, and then the RAN device configures the QoS flow based on the QoS configuration file, and schedules the UE to transfer the interactive service data packet corresponding to the QoS flow. According to the technical solutions of the embodiments of the disclosure, the UE may be scheduled to transfer the interactive service data packet based on the service characteristic of the interactive service data flow, that is, the periodicity information and the flow direction information, so that efficient scheduling may be realized based on the service characteristic of the interactive service data flow, thereby avoiding congestion and freeze of the transfer of the interactive service data flow, and improving the QoS of interactive services.

Through the descriptions of the foregoing implementations, a person skilled in the art easily understands that the exemplary implementations described herein may be implemented through software, or may be implemented through software located in combination with related hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the disclosure.

What is claimed is:

1. A communication method, performed by a policy control function (PCF) entity, the communication method comprising:

receiving a request message of an application function (AF) entity, the request message comprising a service characteristic of an interactive service data flow, the service characteristic of the interactive service data flow comprising periodicity information and flow direction information, the periodicity information indicating frames per second (FPS) information of the interactive service data flow provided by the AF entity to the PCF entity, and the flow direction information indicating a link direction corresponding to the periodicity information;

generating a policy and charging control (PCC) rule based on the request message, the PCC rule comprising a quality of service (QOS) parameter corresponding to the service characteristic of the interactive service data flow, the PCC rule comprising a specific periodicity value obtained by converting the FPS information; and transmitting, to a session management function (SMF) entity, the PCC rule upon which a QoS configuration file is transmitted from the SMF entity to a radio access network (RAN) side, the QoS configuration file comprising a QoS flow for the interactive service data flow.

2. The communication method according to claim 1, wherein the receiving the request message comprises:

receiving the request message directly from the AF entity; or receiving the request message from the AF entity via a network exposure function (NEF) entity.

3. The communication method according to claim 2, wherein the request message of the AF entity is a policy authorization create request or a policy authorization update request, the policy authorization create request comprising a service characteristic of an interactive service data flow provided by the AF entity for a first time; and the policy authorization update request comprising an updated service characteristic of the interactive service data flow provided by the AF entity.

4. The communication method according to claim 1, wherein the transmitting the PCC rule to the SMF entity comprises:

generating a session management (SM) policy control update notification request, the SM policy control update notification request comprising the PCC rule; and transmitting the SM policy control update notification request to the SMF entity; or generating an SM policy control update response, the SM policy control update response comprising the PCC rule; and transmitting the SM policy control update response to the SMF entity; or generating an SM policy control create response, the SM policy control create response comprising the PCC rule; and transmitting the SM policy control create response to the SMF entity.

5. The communication method according to claim 1, wherein the specific periodicity value that is equal to 1000/FPS (ms).

6. A communication method, performed by a radio access network (RAN) device, the method comprising:
   receiving a quality of service (QOS) configuration file from a session management function (SMF) entity, the QoS configuration file comprising a QoS parameter corresponding to a QoS flow for an interactive service data flow, the QoS parameter comprising periodicity information and flow direction information, the periodicity information indicating a data packet transfer period of the QoS flow, and the flow direction information indicating a link direction corresponding to the periodicity information; and
   configuring the QoS flow based on the QoS configuration file, and scheduling user equipment (UE) to transfer an interactive service data packet corresponding to the QoS flow,
   wherein the QoS configuration file is transmitted from the SMF entity to the RAN device according to a policy and charging control (PCC) rule that is generated by a policy control function (PCF) entity, the PCC rule comprising a QoS parameter corresponding to a service characteristic of the interactive service data flow, the PCC rule comprising a specific periodicity value obtained by converting the FPS information, and
   wherein the PCC rule is generated by the PCF entity upon receiving a request message of an application function (AF) entity, the request message comprising the service characteristic of the interactive service data flow, the service characteristic of the interactive service data flow comprising periodicity information and flow direction information, the periodicity information indicating frames per second (FPS) information of the interactive service data flow provided by the AF entity to the PCF entity, and the flow direction information indicating a link direction corresponding to the periodicity information.

7. The communication method according to claim 6, wherein the configuring the QoS flow comprises:
   configuring a radio resource corresponding to the QoS flow, based on the flow direction information included in the QoS configuration file indicating that the periodicity information corresponds to service data in a downlink (DL) direction, and
   the scheduling the UE comprises reserving a first radio resource for the UE based on the periodicity information, and scheduling the UE to receive, through the first radio resource, a DL interactive service data packet transferred by the QoS flow.

8. The communication method according to claim 7, further comprising:
   reserving a second radio resource for the UE based on the periodicity information based on the flow direction information included in the QoS configuration file indicating that the periodicity information corresponds to the service data in the DL direction and corresponds to a receipt confirmation message in an uplink (UL) direction, and scheduling the UE to feed back a receipt confirmation message for the QoS flow for an interactive service data through the second radio resource.

9. The communication method according to claim 6, wherein the configuring the QoS flow and the scheduling the UE comprises:
   reserving a third radio resource for the UE based on the periodicity information based on the flow direction information included in the QoS configuration file indicating that the periodicity information corresponds to service data in a UL direction, and scheduling the UE to transmit a UL interactive service data packet through the third radio resource.

10. An electronic device, comprising:
    at least one memory configured to store program code; and
    at least one processor configured to read the program code and operate as instructed by the program code, the program code including:
    receiving code configured to cause the at least one processor to receive a request message of an application function (AF) entity, the request message comprising a service characteristic of an interactive service data flow, the service characteristic of the interactive service data flow comprising periodicity information and flow direction information, the periodicity information indicating frames per second (FPS) information of the interactive service data flow provided by the AF entity to the PCF entity, and the flow direction information indicating a link direction corresponding to the periodicity information;
    generating code configured to cause the at least one processor to generate a policy and charging control (PCC) rule based on the request message, the PCC rule comprising a quality of service (QOS) parameter corresponding to the service characteristic of the interactive service data flow, the PCC rule comprising a specific periodicity value obtained by converting the FPS information; and
    transmitting code configured to cause the at least one processor to transmit, to a session management function (SMF) entity, the PCC rule upon which a QoS configuration file is transmitted from the SMF entity to a radio access network (RAN) side, the QoS configuration file comprising a QoS flow for the interactive service data flow.

11. The electronic device according to claim 10, wherein the receiving code is configured to cause the at least one processor to:
    receive the request message directly from the AF entity; or
    receive the request message from the AF entity via a network exposure function (NEF) entity.

12. The electronic device according to claim 11, wherein the request message of the AF entity is a policy authorization create request or a policy authorization update request,
    the policy authorization create request comprising a service characteristic of an interactive service data flow provided by the AF entity for a first time; and
    the policy authorization update request comprising an updated service characteristic of the interactive service data flow provided by the AF entity.

13. The electronic device to claim 10, wherein the transmitting code is configured to cause the at least one processor to:
    generate a session management (SM) policy control update notification request, the SM policy control update notification request comprising the PCC rule; and transmit the SM policy control update notification request to the SMF entity; or
    generate an SM policy control update response, the SM policy control update response comprising the PCC rule; and transmit the SM policy control update response to the SMF entity; or generate an SM policy control create response, the SM policy control create response comprising the PCC rule; and transmit the SM policy control create response to the SMF entity.

\* \* \* \* \*